United States Patent
Morita

(10) Patent No.: US 9,849,748 B2
(45) Date of Patent: Dec. 26, 2017

(54) SPRUNG VIBRATION SUPPRESSION DEVICE FOR VEHICLE

(71) Applicant: TOYOTA JIDOSHA KABUSHIKI KAISHA, Toyota-shi, Aichi (JP)

(72) Inventor: Mitsuhiko Morita, Suntou-gun (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 111 days.

(21) Appl. No.: 14/881,229

(22) Filed: Oct. 13, 2015

(65) Prior Publication Data

US 2016/0114644 A1  Apr. 28, 2016

(30) Foreign Application Priority Data

Oct. 28, 2014  (JP) ................................. 2014-218852

(51) Int. Cl.
  *B60W 10/22*  (2006.01)
  *B60G 17/0195*  (2006.01)
  (Continued)

(52) U.S. Cl.
  CPC ......... *B60G 17/0195* (2013.01); *B60G 17/06* (2013.01); *B60W 10/08* (2013.01);
  (Continued)

(58) Field of Classification Search
  CPC ...... B60W 10/08; B60W 30/20; B60W 10/22; B60W 2540/10; B60W 2710/083; B60W 2710/226; B60G 17/0195; B60G 17/06; B60G 2400/10; B60G 2400/33; B60G 2400/39; B60G 2400/41; B60G 2500/10; Y02T 10/7258
  See application file for complete search history.

(56) References Cited

U.S. PATENT DOCUMENTS 6,314,342 B1 * 11/2001 Kramer .............. B60G 17/0195
                                                    180/197
2006/0041353 A1 * 2/2006 Sawada ................. B60W 10/08
                                                    701/37
(Continued)

FOREIGN PATENT DOCUMENTS

JP    2010125986 A    6/2010
JP    2010132254 A    6/2010
(Continued)

*Primary Examiner* — Stephen Holwerda
(74) *Attorney, Agent, or Firm* — Sughrue Mion, PLLC

(57) ABSTRACT

A sprung vibration suppression device for a vehicle includes a motor for generating torque to generate driving/braking force at the vehicle wheels and shock absorbers. The device calculates a target driving/braking force including a base requested driving/braking force requested for driving the vehicle and a damping driving/braking force necessary for sprung damping control and controls the driving/braking force output from the motor in accordance with the target driving/braking force. The device sets the damping driving/braking force to zero and increases the damping force generated by the shock absorbers when the base requested driving/braking force is within a rattling noise generation range set for determining whether there is a possibility that rattling noise is generated in the gear device.

4 Claims, 8 Drawing Sheets

(51) Int. Cl.
*B60W 10/08* (2006.01)
*B60W 30/20* (2006.01)
*B60G 17/06* (2006.01)

(52) U.S. Cl.
CPC ............ *B60W 10/22* (2013.01); *B60W 30/20* (2013.01); *B60G 2400/10* (2013.01); *B60G 2400/33* (2013.01); *B60G 2400/39* (2013.01); *B60G 2400/41* (2013.01); *B60G 2500/10* (2013.01); *B60W 2540/10* (2013.01); *B60W 2710/083* (2013.01); *B60W 2710/226* (2013.01); *Y02T 10/7258* (2013.01)

(56) References Cited

U.S. PATENT DOCUMENTS

| | | | |
|---|---|---|---|
| 2010/0235027 A1* | 9/2010 | Park | B60W 30/18009 701/22 |
| 2010/0235063 A1* | 9/2010 | Kawamoto | B60W 20/15 701/70 |
| 2011/0213527 A1* | 9/2011 | Itabashi | B60W 10/06 701/37 |
| 2011/0251764 A1* | 10/2011 | Iwase | B60K 6/445 701/54 |
| 2012/0247888 A1* | 10/2012 | Chikuma | B60G 17/08 188/266.1 |
| 2013/0141028 A1* | 6/2013 | Fujiwara | B60L 15/20 318/434 |
| 2013/0245888 A1* | 9/2013 | Kikuchi | B60G 17/0195 701/38 |
| 2014/0046558 A1* | 2/2014 | Kim | B60W 10/04 701/54 |
| 2014/0088792 A1* | 3/2014 | Saito | F16F 15/002 701/1 |

FOREIGN PATENT DOCUMENTS

| | | | | |
|---|---|---|---|---|
| JP | WO 2012160701 A1 * | 11/2012 | | F16F 15/002 |
| WO | 2010049769 A1 | 5/2010 | | |

* cited by examiner

SPRUNG VIBRATION SUPPRESSION DEVICE FOR VEHICLE

BACKGROUND OF THE INVENTION

Field of the Invention

The present invention relates to a sprung vibration suppression device applied to a vehicle where driving/braking forces are generated vehicle wheels by a motor.

Description of the Related Art

Conventionally, there is known a so-called sprung damping control for controlling a motor for driving vehicle wheels to suppress sprung vibration. For example, a device disclosed in JP 2010-125986 A causes a motor to output a torque corresponding to a torque acquired by adding a damping control torque for suppressing the sprung vibration to a driving torque necessary to drive a vehicle. The damping control torque alternatively changes between positive and negative values in response to the sprung vibration. Thus, the torque output from the motor may change alternatively between the positive and negative values.

In this case, when the motor torque inverts, gears for reduction provided on a motor output shaft collide to each other through backlash therebetween to generate rattling noise.

Accordingly, when it is predicted that the motor torque alternatively changes between the positive and negative values, the device disclosed in the JP 2010-125987 A prohibits an addition of the damping control torque. Thereby, the generation of the rattling noise can be suppressed.

SUMMARY OF THE INVENTION

However, when it is predicted that the motor torque alternatively changes between the positive and negative values, the device disclosed in the JP 2010-125986 A simply prohibits the sprung damping control and thus, while the sprung damping control is prohibited, the sprung vibration cannot be suppressed.

The present invention has been made for solving the above-mentioned problem and has an object for achieving both the suppression of the generation of the rattling noise and the suppression of the sprung vibration.

The present invention relates to a sprung vibration suppression device for a vehicle, comprising:

a motor (30) for generating torque to be transmitted to at least one of a pair of right and left front vehicle wheels (10*fl* and 10*fr*) and a pair of right and left rear vehicle wheels (10*rl* and 10*rr*) via a gear device (31) to generate driving/braking force at the at least one of the pair of right and left front vehicle wheels (10*fl* and 10*fr*) and the pair of right and left rear vehicle wheels (10*rl* and 10*rr*); shock absorbers (23) for generating damping force for damping the sprung vibration; and an electronic control unit (50, 70) programmed to control the driving/braking force output from the motor and the damping force generated by each of the shock absorbers (23), the electronic control unit (50, 70) being programmed:

to calculate a target driving/braking force (Freq) including a base requested driving/braking force (Fdrv) requested for driving the vehicle (1) and a damping driving/braking force (Fpbc, Fpbcreq) necessary for sprung damping control; and to control the driving/braking force output from the motor (30) in accordance with the calculated target driving/braking force (Freq).

In order to achieve the above-mentioned object, the electronic control unit (50, 70) is programmed:

to determine whether the base requested driving/braking force (Fdrv) is within a rattling noise generation range (R) (step S11 of FIG. 5), which is set for determining whether there is a possibility that rattling noise is generated in the gear device (31), the rattling noise generation range (R) being defined by a first set value (Fref1) as a lower limit value and a second set value (Fref2) as an upper limit value, the first set value (Fref1) being a negative value and the second set value (Fref2) being a positive value; and to set the damping driving/braking force (Fpbc, Fpbcreq) to zero (step S12 of FIG. 5) and increase the damping forces generated by the shock absorbers (23) (step S13 of FIG. 5) when the electronic control unit determines that the base requested driving/braking force (Fdrv) is within the rattling noise generation range (R).

The sprung vibration suppression device according to the present invention comprises the motor for generating the driving/braking force at the at least one of the pair of the right and left front vehicle wheels and the pair of the right and left rear vehicle wheels. The motor transmits torque to drive vehicle wheels (at least one of the pair of the right and left front wheels and the pair of the right and left rear wheels) via the gear device to generate the driving/braking force at the drive vehicle wheels. The driving/braking force means both of driving force and braking force and the term "driving/braking force" will be used when it is not necessary to specify whether a force is the driving force or the braking force. A part of the driving/braking force generated at the vehicle wheels is converted to vertical force in a vehicle body by suspensions. Therefore, the sprung vibration (i.e., vibration of the vehicle body) can be suppressed by controlling the sprung driving/braking force.

The electronic control unit (hereinafter, will be also referred to as "ECU") calculates the target driving/braking force including the base requested driving/braking force requested for driving the vehicle and the damping driving/braking force necessary for the sprung damping control. The base requested driving/braking force is, for example, a driver-requested driving/braking force set on the basis of an amount of operation of an accelerator carried out by a driver of the vehicle. The damping driving/braking force is set, for example, on the basis of at least one of an estimated value of a vibration state of the vehicle body and a detected value of the vibration state of the vehicle body. The target driving/braking force is set, for example, on the basis of the sum of the base requested driving/braking force and the damping driving/braking force.

Further, the ECU controls the driving/braking force output from the motor in accordance with the target driving/braking force. Thereby, the sprung vibration can be suppressed during the travelling of the vehicle.

The value of the damping driving/braking force alternatively inverts between positive and negative values depending on the sprung vibration. When the damping driving/braking force serves as the driving force, the damping driving/braking force is a positive value and when the damping driving/braking force serves as the braking force, the damping driving/braking force is a negative value. Therefore, when an absolute value of the base requested driving/braking force is small, the value of the target driving/braking force alternatively inverts between positive and negative values. Thereby, the motor torque repeatedly crosses zero and the rattling noise is generated from the collision of the gears with each other due to the backlash between the gears. Accordingly, the ECU determines whether the base requested driving/braking force is within the rattling noise generation range, which is defined by the first set value as the lower limit value which is a negative value and the second set value as an upper limit value which is a positive value. This rattling noise generation range is set for determining whether there is a possibility that the rattling noise is generated. In this case, the first and second set values may be set such that the absolute value of the first set value is the same as the absolute value of the second set value. However, the present invention is not limited to such first and second set values.

When the ECU determines that the base requested driving/braking force is within the rattling noise generation range, the ECU sets the damping driving/braking force to zero. Thereby, the generation of the rattling noise can be suppressed. In addition, the ECU increases the damping force generated by the shock absorbers. Therefore, when the sprung damping control is not executed, the sprung vibration can be rapidly damped by the damping force generated by the shock absorbers.

As a result, according to the preset invention, both of the suppression of the generation of the rattling noise and the suppression of the sprung vibration can be achieved.

According to an aspect of the present invention, the ECU is programmed:

to set an increase amount (Cup) for increasing the damping force depending on an absolute value (|Fpbcreq|) of the damping driving/braking force (step S13' of FIG. 7) when the electronic control unit (50, 70) determines that the base requested driving/braking force (Fdrv) is within the rattling noise generation range (R); and to add the increase amount (Cup) to the damping force to increase the damping force.

According to this aspect of the present invention, when it is determined that the base requested driving/braking force is within the rattling noise generation range, set is the increase amount for increasing the damping force depending on the absolute value of the damping driving/braking force necessary for the sprung damping control. For example, when the absolute value of the damping driving/braking force is large, the increase amount for increasing the damping force (i.e., an addition amount to the normal damping force) is set to a value larger than a value set when the absolute value of the damping driving/braking force is small. Thereby, the sprung vibration can be appropriately damped when the sprung damping control is not executed.

According to another aspect of the present invention, the ECU (50, 70) is programmed to set the increase amount (Cup) for increasing the damping force to zero when the ECU (50, 70) determines that the base requested driving/braking force (Fdrv) is within the rattling noise generation range (R) and the absolute value (|Fpbcreq|) of the damping driving/braking force is equal to or smaller than a predetermined set value (Fa).

On the other hand, when the ECU determines that the base requested driving/braking force (Fdrv) is within the rattling noise generation range (R) and the absolute value (|Fpbcreq|) of the damping driving/braking force is larger than the predetermined set value (Fa), the ECU (50, 70) is programmed to set the increase amount (Cup) for increasing the damping force to a variable amount which increases as the absolute value (|Fpbcreq|) of the damping driving/braking force increases.

When the sprung damping control is executed, the damping driving/braking force is set so as to suppress the vibration having a frequency around the sprung sympathetic frequency. On the other hand, in general, the ECU does not execute a damping force control only for damping the sprung vibration and executes a damping force control in consideration of the general vehicle state. For example, the damping forces generated by the shock absorbers are controlled so as to improve the vehicle attitude. Thus, when the sprung damping control using the driving/braking force is not executed and the increase amount for increasing the damping force depending on the absolute value of the damping driving/braking force is set, an essential function is not achieved and thus, the feeling of ride of the vehicle may be degraded.

Accordingly, in this aspect of the present invention, when the absolute value of the damping driving/braking force necessary for the sprung damping control is equal to or smaller than the predetermined set value, the increase amount for increasing the damping force is set to zero. In other words, the damping forces generated by the shock absorbers are not increased. Therefore, when the sprung vibration is small, the ECU can achieve the essential function appropriately. In this case, an influence of the sprung vibration on the driver of the vehicle is small and thus, no problem occurs.

On the other hand, when the absolute value of the damping driving/braking force necessary for the sprung damping control is larger than the predetermined set value, the increase amount for increasing the damping force is set to a value which increases as the absolute value of the damping driving/braking force increases. Thus, the sprung vibration, which may cause the driver to feel discomfort, can be suppressed. Therefore, according to this aspect of the present invention, both of the suppression of the sprung vibration and the appropriate damping force control can be achieved suitably.

According to another aspect of the present invention, the ECU (50, 70) is programmed to increase an increase degree of the increase amount (Cup) for increasing the damping force with respect to an increase of the absolute value (|Fpbcreq|) of the damping driving/braking force as the absolute value (|Fpbcreq|) of the damping driving/braking force increases when the ECU (50, 70) determines that the base request driving/braking force (Fdrv) is within the rattling noise generation range (R).

According to this aspect of the present invention, as the absolute value of the damping driving/braking force necessary for the sprung damping control increases, the increase degree of the increase amount for increasing the damping force with respect to the absolute value of the damping driving/braking force is increased. Therefore, when the sprung vibration is small, the increase amount for increasing the damping force is set to a considerably small value and thus, the ECU can achieve its essential function. Further, when the sprung vibration becomes large, the increase amount for increasing the damping force is set to a large value and thus, the sprung vibration, which may cause the driver to feel discomfort, can be suppressed. Therefore, according to this aspect of the present invention, both of the suppression of the sprung vibration and the appropriate damping force control can be achieved suitably. In addition, the increase amount for increasing the damping force does not increase rapidly and thus, the driver is unlikely to feel discomfort.

In the aforementioned description, for facilitating understanding of the present invention, elements of the sprung vibration suppression device according to the present invention are accompanied with the same reference symbols as reference symbols used for elements of a sprung vibration suppression device according to an embodiment of the present invention. However, the present invention is not limited to the embodiment of the present invention.

DESCRIPTION OF THE PREFERRED EMBODIMENTS

Figure 1:
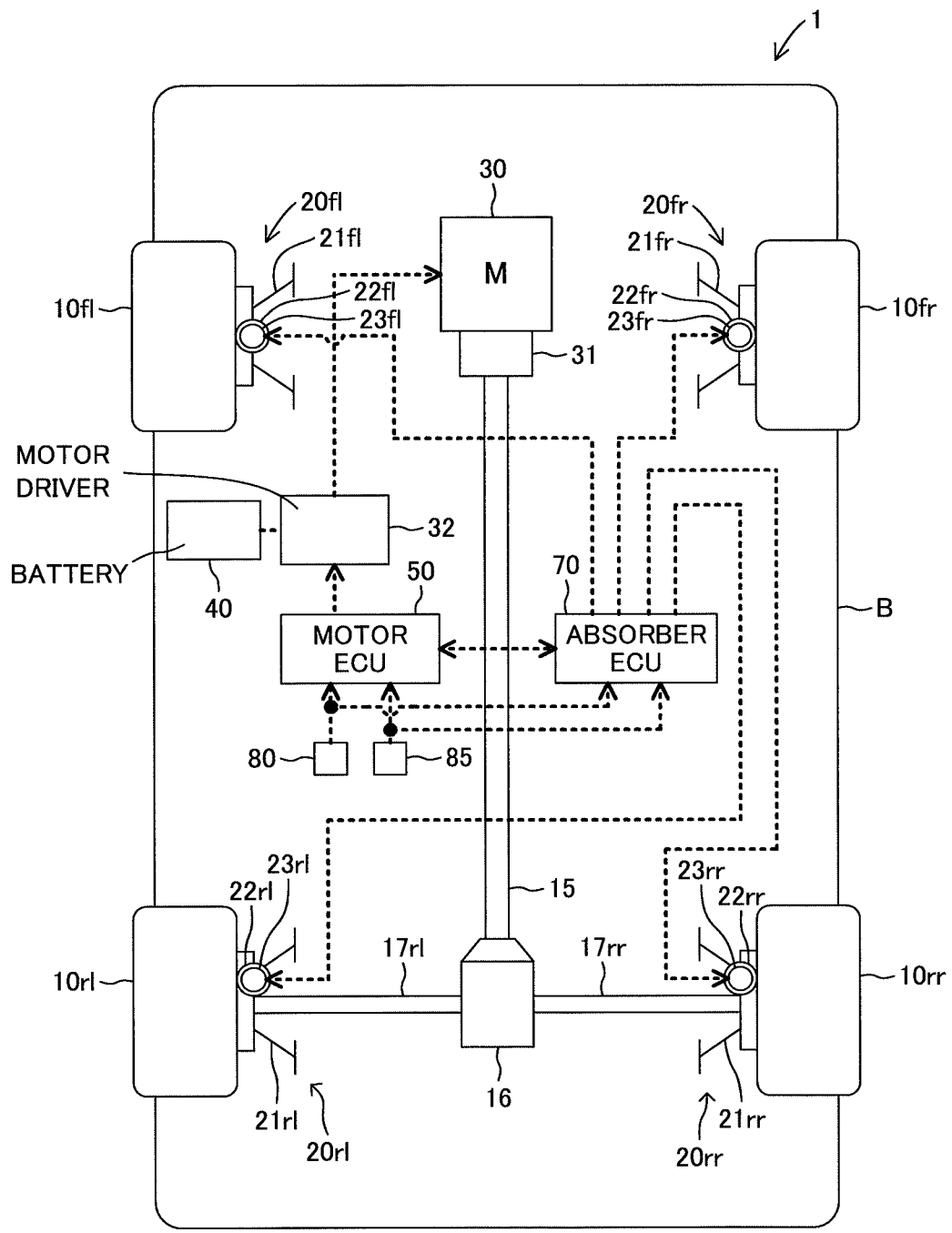
FIG. 1 illustrates a schematic configuration view of a vehicle incorporating a driving/braking control device for the vehicle according to an embodiment of the present invention.

Below, an embodiment according to the present invention will be described in detail with reference to the drawings. FIG. 1 schematically illustrates a configuration of a vehicle 1 incorporating a sprung vibration suppression device for a vehicle according to an embodiment of the present invention.

The vehicle 1 includes left and right front vehicle wheels 10*fl* and 10*fr* and left and right rear vehicle wheels 10*rl* and 10*rr*. The left and right front vehicle wheels 10*fl* and 10*fr* and the left and right rear vehicle wheels 10*rl* and 10*rr* are suspended on a body B of the vehicle 1 (hereinafter, this body will referred to as "the vehicle body") by suspensions 20*fl*, 20*fr*, 20*rl* and 20*rr*, respectively.

The suspensions 20*fl*, 20*fr*, 20*rl* and 20*rr* include link mechanisms 21*fl*, 21*fr*, 21*rl* and 21*rr* constituted by suspension arms and the like, suspension springs 22*fl*, 22*fr*, 22*rl* and 22*rr* and shock absorbers 23*fl*, 23*fr*, 23*rl* and 23*rr*, respectively. The link mechanism 21*fl*, 21*fr*, 21*rl* and 21*rr* are connection mechanisms for connecting the vehicle wheels 10*fl*, 10*fr*, 10*rl* and 10*rr* to the vehicle body B, respectively. The suspension springs 22*fl*, 22*fr*, 22*rl* and 22*rr* serve to support loads exerted in the vertical direction to absorb shocks, respectively. The shock absorbers 23*fl*, 23*fr*, 23*rl* and 23*rr* serve to damp vibration of sprung mass (i.e., the vehicle body B). The suspensions 20*fl*, 20*fr*, 20*rl* and 20*rr* may be known four-wheels independent suspensions such as wishbone-type suspensions, strut-type suspensions and the like, respectively.

Hereinafter, the vehicle wheels 10*fl*, 10*fr*, 10*rl* and 10*rr* will be collectively referred to as "the vehicle wheels 10", the suspensions 20*fl*, 20*fr*, 20*rl* and 20*rr* will be collectively referred to as "the suspensions 20", the link mechanisms 21*fl*, 21*fr*, 21*rl* and 21*rr* will be collectively referred to as "the link mechanisms 21", the suspension springs 22*fl*, 22*fr*, 22*rl* and 22*rr* will be collectively referred to as "the suspension springs 22" and the shock absorbers 23*fl*, 23*fr*, 23*rl* and 23*rr* will be collectively referred to as "shock absorbers 23". In addition, the front vehicle wheels 10*fl* and 10*fr* will be collectively referred to as "the front vehicle wheels 10*f*" and the rear vehicle wheels 10*rl* and 10*rr* will be collectively referred to as "the rear vehicle wheels 10*r*".

The vehicle 1 according to the present embodiment is a rear-wheel-drive type vehicle and includes a motor 30 as a drive power source for the rear vehicle wheels 10*r*. Note that the vehicle 1 may be any vehicles each including a motor as a drive power source and, for example, may be a hybrid vehicle including a drive power source comprised of a combination of a motor and an internal combustion engine. Alternatively, the vehicle 1 may be an in-wheel-motor type vehicle including motors provided on the vehicle wheels, respectively. Further, the vehicle 1 is not limited to a rear-wheel-drive vehicle and may be a front-wheel-drive vehicle or a four-wheel-drive type vehicle.

For example, a brushless motor may be used as the motor 30. An output torque of the motor 30 is transmitted to a propeller shaft 15 via a reduction gear 31. A torque transmitted to the propeller shaft 15 is transmitted therefrom to the rear vehicle wheel 10*rl* via a differential device 16 and a drive shaft 17*rl* and to the rear vehicle wheel 10*rr* via the differential device 16 and drive shaft 17*rr*.

The motor 30 is connected to a motor driver 32. For example, the motor driver 32 is an inverter and converts a direct current supplied from a battery 40 to an alternate current to supply the alternate current to the motor 30. Thereby, the motor 30 is driven in a controllable manner to generate a torque, thereby to supply a driving force to the rear vehicle wheels 10*r*. In this manner, an operation for supplying an electric power to the motor 30 to generate a driving torque is referred to as "the drive operation".

Further, the motor 30 functions as an electric generator for generating an electric power by energy of rotation of the rear vehicle wheels 10*r* to regenerate the generated electric power and supply the electric power to the battery 40 via the motor driver 32. A braking torque generated by this electric power generation with the motor 30 is applied to the rear vehicle wheels 10*r*. In this description, the driving force corresponds to a positive driving/braking force and the braking force corresponds to a negative driving/braking force.

Although friction brake devices (not illustrated) for generating friction braking force by cylinders (not illustrated) operated by fluid pressure, are provided on the vehicle wheels 10, respectively, the friction brake devices are not directly related to the present invention. Thus, the illustration and the description of the friction brake devices will be omitted.

The motor drive 32 is connected to an electronic control unit 50 for controlling the motor 30. The electronic control unit 50 (hereinafter, will be referred to as "the motor ECU 50") is comprised of a microcomputer as a main part including a CPU, a ROM, a RAM and the like and executes various instructions (or programs) to control the operation of the motor 30 independently. The motor ECU 50 is connected to an operation state detection device 80 for detecting a state of an operation carried out by a driver for driving the vehicle 1 and a motion state detection device 85 for detecting a motion state of the vehicle 1 and is configured to receive detection signals output from the detection devices 80 and 85, respectively.

The operation state detection device 80 includes sensors such as an accelerator sensor (not illustrated), a brake sensor (not illustrated) and a steering angle sensor (not illustrated). The accelerator sensor serves to detect an amount of an accelerator operation carried out by the driver on the basis of an amount of depression of an accelerator pedal or an angle of the accelerator pedal or a pressure of the depression of the accelerator pedal or the like. The brake sensor serves to detect an amount of brake operation carried out by the driver on the basis of an amount of depression of a brake pedal or an angle of the brake pedal or a pressure of the depression of the brake pedal or the like. The steering sensor serves to detect a steering operation amount corresponding to an amount of operation of a steering wheel carried out by the driver.

The motion state detection device 85 includes vehicle wheel angular rotation speed sensors (not illustrated), a vehicle speed sensor (not illustrated), a yaw rate sensor (not illustrated), sprung acceleration sensors (not illustrated), a lateral acceleration sensor (not illustrated), a pitch rate sensor (not illustrated), a roll rate sensor (not illustrated), stroke sensors (not illustrated), unsprung acceleration sensors (not illustrated) and the like. The vehicle wheel angular rotation speed sensors serve to detect vehicle wheel angular rotation speeds corresponding to angular rotation speeds of the vehicle wheels 10, respectively. The vehicle speed sensor serves to detect a vehicle speed corresponding to a travelling speed of the vehicle body B by a calculation on the basis of vehicle wheel angular speeds of the four vehicle wheels 10, respectively. The yaw rate sensor serves to detect a yaw rate of the vehicle body B. The sprung acceleration sensors serve to detect vertical accelerations of the vehicle body B (the sprung mass) at positions corresponding to the vehicle wheels 10, respectively. The lateral acceleration sensor serves to detect a lateral acceleration in a lateral direction of the vehicle body B. The pitch rate sensor serves to detect a pitch rate of the vehicle body B. The roll rate sensor serves to detect a roll rate of the vehicle body B. The stroke sensors serve to detect stroke amounts of the suspensions 20, respectively. The unsprung acceleration sensors serve to detect vertical accelerations of the unsprung masses of the vehicle wheels 10, respectively. Note that a negative sensor value means that a physical amount indicated by the negative sensor value has a direction opposite to a direction of a physical amount indicated by the positive sensor value. Further, an absolute value of the sensor value is used for indicating a magnitude of the sensor value.

The shock absorbers 23 provided on the vehicle wheels 10, respectively are damping-force-variable type hydraulic dampers, respectively, each of which can vary damping force, for example, by rotating a rotary valve provided in a piston located in the shock absorber 23 to vary an opening degree of hydraulic passage. Each of the shock absorbers 23 may be an absorber which can vary damping force in a continuous manner or in a step-by-step manner. The shock absorbers 23 are connected to an electronic control unit 70 for controlling damping forces. The electronic control unit 70 (hereinafter, will be referred to as "the absorber ECU 70") is comprised of a microcomputer as a main part including a CPU, a ROM, a RAM and the like and executes various instructions (or programs) to control damping forces of the shock absorbers 23 independently.

The absorber ECU 70 is connected to the operation state detection device 80 and the motion state detection device 85 and is configured to receive detection signals output from the detection devices 80 and 85. In addition, the absorber ECU 70 is connected to the motor ECU 50 in a send/receive manner.

The absorber ECU 70 executes controls such as:

a vehicle-speed-responsive control for changing each of the damping forces to an optimum damping force depending on the vehicle speed, an anti-dive control for predicting a dive of the vehicle due to an operation of the brake pedal and reducing the dive, an anti-squat control for predicting a squat of the accelerating vehicle and reducing the squat, a roll attitude control for improving a roll attitude of the vehicle at vehicle turning, a sprung damping control for suppressing a sprung sympathetic vibration, an unsprung damping control for suppressing an unsprung sympathetic vibration, a VSC cooperative control for changing the damping forces depending on a state of skid of the vehicle, and a mode switching control for switching the damping forces depending on whether a sport mode or a normal mode is selected.

Next, the sprung damping control executed by the motor ECU 50 will be described. When disturbance is exerted on the vehicle wheels 10 by unevenness of a road or the like while the vehicle is travelling, the disturbance is transmitted to the vehicle body B via the suspensions 20. Thereby, the vehicle body B vibrates at a frequency around a sprung sympathetic vibration frequency (for example, 1.5 Hz). This vibration will be referred to as "the sprung vibration". The sprung vibration includes a component in a vertical direction (z direction) at a gravity position of the vehicle (hereinafter, this component will be referred to as "the bounce vibration") and a component in a pitch direction (A direction) about a lateral axis passing through the gravity of the vehicle (hereinafter, this component will be referred to as the pitch vibration"). When the sprung vibration occurs, at least one of the bounce and pitch vibrations occurs. In addition, the sprung vibration occurs when a torque output from the motor 30 changes in accordance with an operation of the accelerator pedal carried out by the driver.

A part of the driving/braking forces of the vehicle wheels 10 is converted to a force exerting in a vertical direction of the vehicle body B by the respective suspensions 20 (mainly, the respective link mechanisms 21). Therefore, a force for suppressing the sprung vibration can be generated in the vehicle body B via the suspensions 20 by changing a torque output from the motor 30 in a synchronous manner with the sprung vibration. The vehicle 1 according to the present embodiment is a rear-wheel-drive type vehicle and thus, in particular, a force for suppressing the pitch vibration can be effectively generated. Accordingly, the motor ECU 50 sets, as a target driving/braking force, a value acquired by adding a damping driving/braking force for suppressing the sprung vibration to a driver-requested driving/braking force set depending on an operation of the accelerator pedal carried out by the driver and controls the drive of the motor 30 to generate a driving/braking force corresponding to the target driving/braking force at the vehicle wheels 10.

The motor ECU 50 uses a previously constructed motion model of sprung vibration to calculate state variables of the sprung vibration. The state variables of the sprung vibration include displacements z and θ of the vehicle body B and rates dz/dt and dθ/dt of the displacements z and θ. The displacements z and θ can be acquired by applying, to the motion model, a driver-requested driving torque (a vehicle wheel torque of the drive vehicle wheel 10r converted from the driver-requested driving torque) depending on a driver-requested driving/braking force and estimated present vehicle wheel torque. The motor ECU 50 corrects the driver-requested driving/braking force such that the state variables converge on zero and controls an output of the motor on the basis of the corrected driver-requested driving/braking force. The correction amount of the driver-requested driving/braking force corresponds to a sprung damping control amount for suppressing the sprung vibration.

Figure 2:
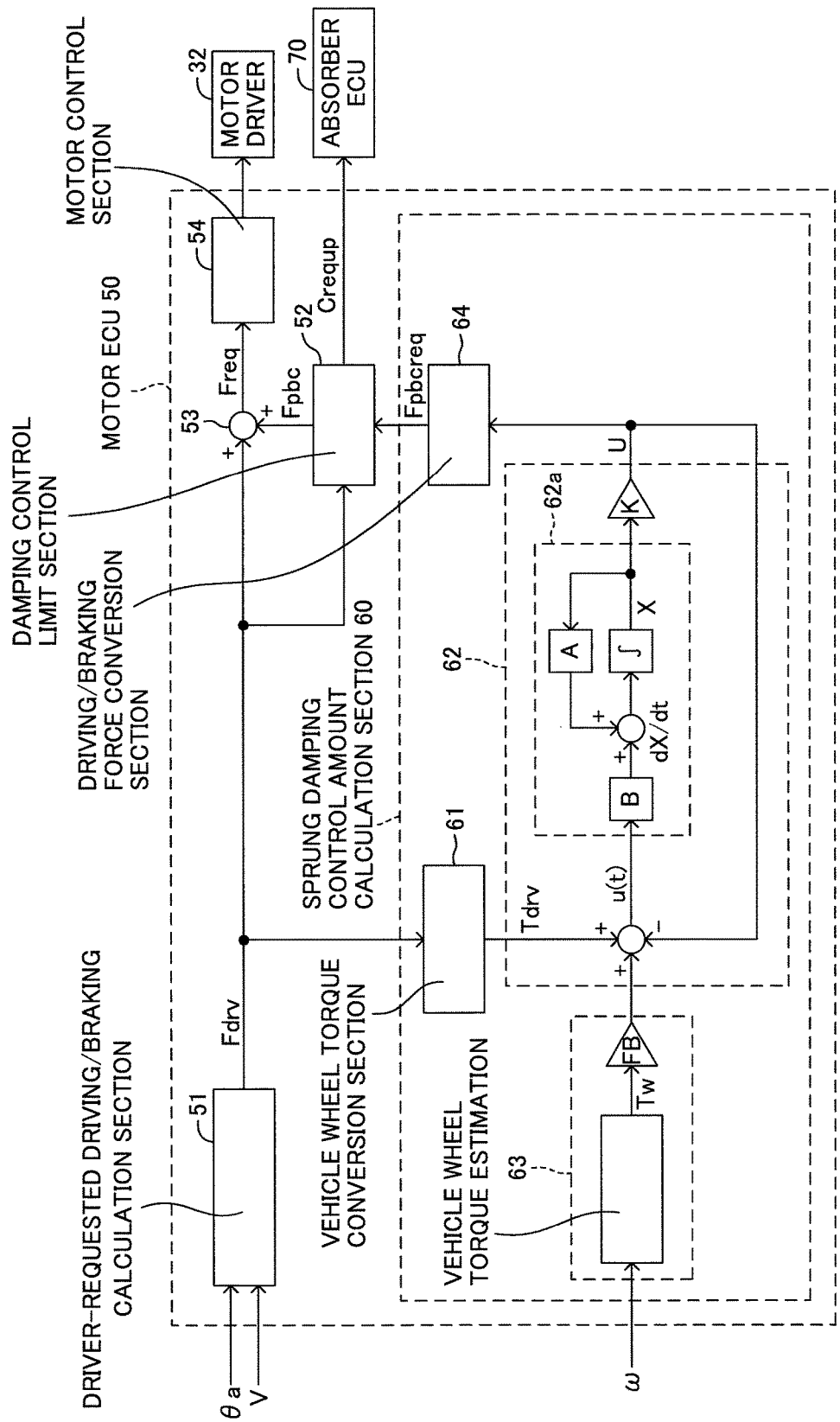
FIG. 2 illustrates a control block view showing a function of a motor ECU.

FIG. 2 illustrates a control block diagram showing a function of the microcomputer of the motor ECU 50. The motor ECU 50 includes a driver-requested driving/braking force calculation section 51, a sprung damping control amount calculation section 60, a damping control limit section 52, an addition section 53 and a motor control section 54. Now, functions of the sections 50 to 54 and 60 and relationships therebetween will be briefly described.

Figure 3:
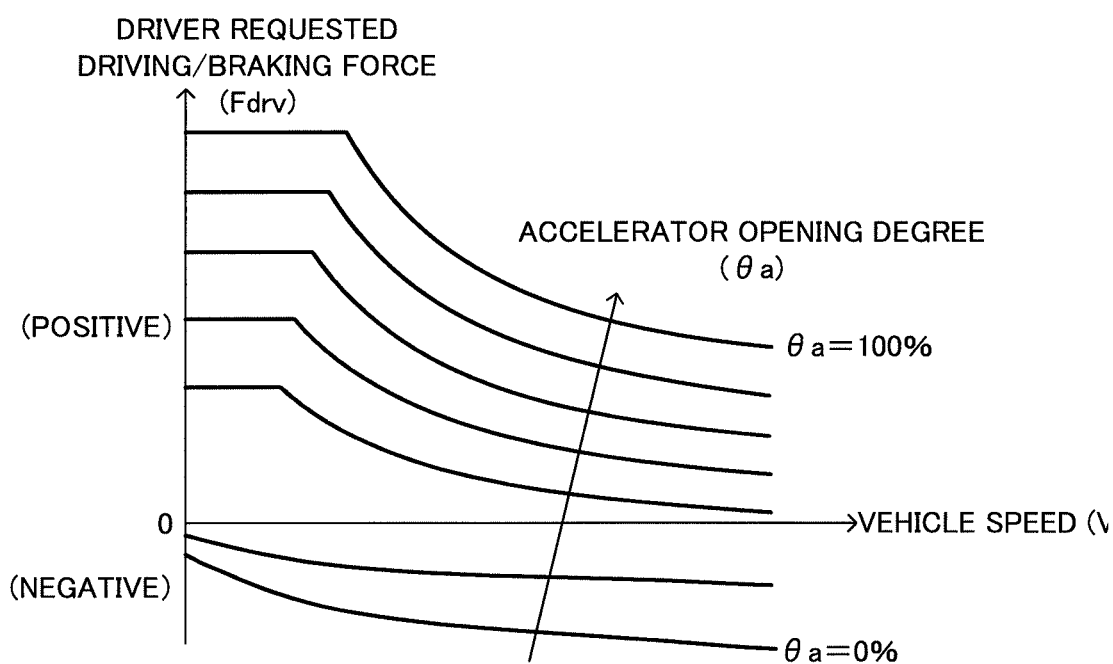
FIG. 3 illustrates a lookup table for setting a driver-requested driving/braking force.

The driver-requested driving/braking force calculation section 51 receives an accelerator opening degree θa detected by the accelerator sensor and a vehicle speed V detected by the vehicle speed sensor and calculates a driver-requested driving/braking force Fdrv on the basis of the accelerator opening degree θa, the vehicle speed V and a driver-requested driving/braking force lookup table illustrated in FIG. 3. The driver-requested driving/braking force lookup table is an example and according to this lookup table, the calculated driver-requested driving/braking force Fdrv increases as the accelerator opening degree θa and the calculated driver-requested driving/braking force Fdrv decreases as the vehicle speed V increases. The driver-requested driving/braking force calculation section 51 supplies the calculated driver-requested driving/braking force Fdrv to the damping control limit section 52, the addition section 53 and the sprung damping control amount calculation section 60.

The sprung damping control amount calculation section 60 estimates a sprung vibration on the basis of variations of the vehicle wheel angular speeds of the drive vehicle wheels 10r (variations of the vehicle wheel torques), calculates a requested damping driving/braking force Fpbcreq corresponding to a sprung damping control amount necessary to suppress the sprung vibration and supplies the calculated requested damping driving/braking force Fpbcreq to the damping control limit section 52.

The damping control limit section 52 serves to limit the sprung damping control on the basis of the driver-requested driving/braking force Fdrv. In particular, the damping control limit section 52 calculates a damping driving/braking force Fpbc acquired by applying a limitation to the requested damping driving/braking force Fpbcreq and supplies the calculated damping driving/braking force Fpbc to the addition section 53.

The addition section 53 adds the damping driving/braking force Fpbc to the driver-requested driving/braking force Fdrv to acquire a conclusive target driving/braking force Freq and supplies the target driving/braking force Freq to the motor control section 54. The damping driving/braking force Fpbc is a control amount for correcting the driver-requested driving/braking force Fdrv such that no sprung vibration is generated.

The motor control section 54 calculates a motor torque necessary to generate driving/braking forces corresponding to the target driving/braking force Freq at the drive vehicle wheels 10r and outputs drive control signals (for example, PWM control signals) to the motor driver 32 for flowing, through the motor 30, electric current corresponding to a target electric current depending on the calculated motor torque. When the target driving/braking force Freq is positive, that is, the target driving/braking force Freq indicates a driving force, electric current is supplied to the motor 30 from the battery 40 via the motor driver 32. Thereby, a driving torque of the motor 30 is transmitted to the vehicle wheels 10r to generate driving forces at the vehicle wheels 10r. On the other hand, when the target driving/braking force Freq is negative, that is, the target driving/braking force Freq indicates a braking force, the motor 30 is operated as an electric generator and electric power generated by the motor 30 is regenerated to the battery 40 via the motor driver 32. Thereby, a regenerative braking torque of the motor 30 is transmitted to the vehicle wheels 10r to generate braking forces at the vehicle wheels 10r.

The target driving/braking force Freq includes the damping driving/braking force Fpbc and thus, the drive control of the motor 30 according to the target driving/braking force Freq can suppress the sprung vibration.

Next, the sprung damping control amount calculation section 60 will be described. The sprung damping control amount calculation section 60 includes a wheel torque conversion section 61, a feedforward control section 62, a feedback control section 63 and a driving/braking force conversion section 64. Note that the sprung damping control amount calculation section 60 is described in detail as "the sprung damping control section" in JP 2010-132254 A. Therefore, the various methods for calculating the sprung damping control amount described in JP 2010-132254 A can be incorporated in the description of this application.

The vehicle wheel torque conversion section 61 converts the driver-requested driving/braking force Fdrv to driver-requested vehicle wheel torques Tdrv for the drive vehicle wheels 10r and supplies the driver-requested vehicle wheel torques Tdrv to the feedforward control section 62.

The feedforward control section 62 includes a configuration of an optimum regulator. The feedforward control section 62 includes a motion model section 62a including the motion model of the sprung vibration of the vehicle body B and the driver-requested vehicle wheel torques Tdrv are input to the motion model section 62a. The motion model section 62a calculates a response of the state variables of the vehicle body B with respect to the input driver-requested vehicle wheel torques Tdrv and calculates correction amount of the driver-requested vehicle wheel torques Tdrv for converging the state variables to minimum values, respectively.

The feedback control section 63 calculates estimated vehicle wheel torques Tw of the drive vehicle wheels 10r using a following expression, the vehicle wheel angular speeds ω detected by the vehicle angular speed sensors provided on the drive vehicle wheels 10r or time differential values of vehicle wheel rotation speeds r*ω. In the following expression, M is a mass of the vehicle and r is a radius of the drive vehicle wheel 10r.

$$Tw = M * r^2 * d\omega/dt$$

The feedback control section 63 multiplies each of the estimated vehicle wheel torques Tw by a feedback gain. The feedback gain is a gain for adjusting a contribution balance of the driver-requested vehicle wheel torque Tdrv in the motion model section 62a. The value acquired by multiplying each of the estimated vehicle wheel torques Tw by the feedback gain is added to the driver-requested vehicle wheel torque Tdrv as a disturbance input and the value acquired by multiplying each of the estimated vehicle wheel torque Tw by the feedback gain is input to the motion model section 62a. Thereby, The feedforward control section 62 can calculate a correction amount for correcting the driver-requested vehicle wheel torques Tdrv in consideration of the disturbance. Hereinafter, the value acquired by multiplying each of the estimated vehicle wheel torques Tw by the feedback gain will be also referred to as "the estimated vehicle wheel torque Tw".

The correction amount for correcting the driver-requested vehicle wheel torque Tdrv is supplied to the driving/braking force conversion section 64. The driving/braking force conversion section 64 converts an unit of the correction amount for correcting the driver-requested vehicle wheel torque Tdrv to a unit of the driving/braking force and supplies, to the damping control limit section 52, the requested damping driving/braking force Fpbcreq indicating the driving/braking force acquired by the conversion. The requested damping driving/braking force Fpbcreq indicates a control amount necessary to suppress the generation of the sprung vibration.

The sprung damping control amount calculation section 60 stores a state equation of state variables in the bounce and pitch directions, to which the driver-requested vehicle wheel torque Tdrv and the estimated vehicle wheel torque Tw as a disturbance are input, on the basis of the motion model of the sprung vibration (the bounce and pitch vibrations). The sprung damping control amount calculation section 60 determines an input (a vehicle wheel torque value) for converging state variables in the bounce and pitch directions on zero using the state equation and an optimum regulator theory and calculates a correction amount for correcting the driver-requested driving/braking force Fdrv, that is, a sprung damping control amount on the basis of the vehicle wheel torque value.

Figure 4:
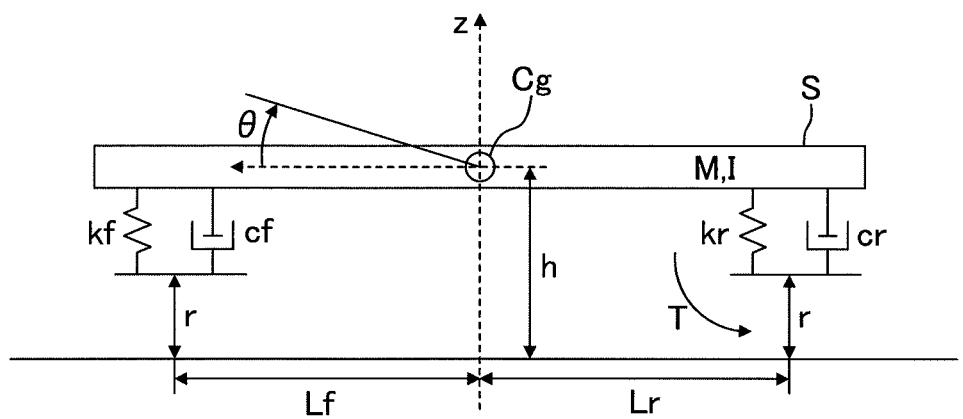
FIG. 4 illustrates a view for describing a dynamic model of sprung vibration.

For example, as illustrated in FIG. 4, the motion model is a model constructed under the condition where the vehicle body B is considered as a rigid body S having a mass M and an inertia moment I and the rigid body S is supported by the front suspensions 20f each having an elastic coefficient kf and a damping rate cf and the rear suspensions 20r each having an elastic coefficient kr and a damping rate cr. In this case, motion equations at the vehicle gravity Cg in the bounce and pitch directions can be expressed as following expressions (1a) and (1b), respectively.

$$M\frac{d^2z}{dt^2} = -kf(z+Lf\cdot\theta) - cf\left(\frac{dz}{dt}+Lf\cdot\frac{d\theta}{dt}\right) - kr(z-Lr\cdot\theta) - cr\left(\frac{dz}{dt}-Lr\cdot\frac{d\theta}{dt}\right) \quad (1a)$$

$$I\frac{d^2\theta}{dt^2} = -Lf\left\{kf(z+Lf\cdot\theta)+cf\left(\frac{dz}{dt}+Lf\cdot\frac{d\theta}{dt}\right)\right\} + Lr\left\{kr(z-Lr\cdot\theta)+cr\left(\frac{dz}{dt}-Lr\cdot\frac{d\theta}{dt}\right)\right\} + \frac{h}{r}\cdot T \quad (1b)$$

In the expressions (1a) and (1b), Lf is a distance between the vehicle gravity Cg and a front vehicle wheel shaft, Lr is a distance between the vehicle gravity Cg and a rear vehicle wheel shaft and r is a vehicle wheel radius. Further, h is a distance between the vehicle gravity Cg and a road surface. Note that in the expression (1a), first and second terms of a right side are components of a force exerted from the front vehicle wheel shaft and third and fourth terms of the right side are components of a force exerted from the rear vehicle wheel shaft. Further, in the expression (1b), a first term of a left side is a moment component derived from a force exerted from the front vehicle wheel shaft, a second term of the left side is a moment component derived from a force exerted from the rear vehicle wheel shaft and a third term of the left side is a moment component derived from a force about the vehicle gravity Cg exerted by the vehicle wheel torque T(=Tdrv+Tw) generated at the drive vehicle wheels 10rl and 10rr.

When the displacements z and θ and the changing rates dz/dt and dθ/dt are expressed by a state variable vector X(t), the expressions (1a) and (1b) can be converted to a state equation of a linear system as in a following expression (2a).

$$dX(t)/dt = A^*X + B^*u(t) \quad (2a)$$

In this expression (2a), X(t), A and B are as follows.

$$X(t) = \begin{pmatrix} z \\ dz/dt \\ \theta \\ d\theta/dt \end{pmatrix}, A = \begin{pmatrix} 0 & 1 & 0 & 0 \\ a1 & a2 & a3 & a4 \\ 0 & 0 & 0 & 1 \\ b1 & b2 & b3 & b4 \end{pmatrix}, B = \begin{pmatrix} 0 \\ 0 \\ 0 \\ p1 \end{pmatrix}$$

When replacing coefficients relating to z, θ, dz/dt and dθ/dt in the matrix A with elements a1 to a4, the elements a1 to a4 are as follows.

$a1 = -(kf+kr)/M$ $a2 = -(cf+cr)/M$ $a3 = -(kf^*Lf - kr^*Lr)/M$ $a4 = -(cf^*Lf - cr^*Lr)/M$ $b1 = -(Lf^*kf - Lr^*kr)/I$ $b2 = -(Lf^*cf - Lr^*cr)/I$ $b3 = -(Lf^2{}^*kf + Lr^2{}^*kr)/I$ $b4 = -(Lf^2{}^*cf + Lr^2{}^*cr)/I$

Further, regarding u(t) in the expression (2a), u(t)=T and u(t) is an input to a system expressed by the expression (2a).

Therefore, from the expression (1b), an element p1 in a matrix B is p1=h/(I*r).

When u(t) in the expression (2a) is expressed as a following expression (2b), the expression (2a) can be expressed as a following expression (2c).

$$u(t) = -K^*X(t) \quad (2b)$$

$$dX(t)/dt = (A-BK)^*X(t) \quad (2c)$$

Therefore, when solving the differential equation of the state vector X(t) (the expression (2c)) under the condition where an initial value X$_0$(t) of the X(t)=(0, 0, 0, 0) assuming that no vibration occurs before a torque is input to determine a gain K for converging the X(t) on zero, that is, for converging the displacements in the bounce and pitch directions and the time change rates of the displacements on zero, a torque value u(t) for suppressing the sprung vibration can be determined.

The gain k can be determined using the optimum regulator theory. According to this theory, when a value of quadric performance function J (an integrating range is from 0 to ∞) expressed by a following equation (3a) becomes minimum, the X(t) stably converges in the state equation (2a), $$J = \int (X^T Q X + u^T R u) dt \quad (3a)$$

Further, it is known that a matrix K for minimizing the performance function J is given as K=R$^{-1}$*B$^T$*P.

In this regard, P is a solution of Riccati equation expressed by a following expression.

$$-dP/dt = A^T P + PA + Q - PBR^{-1}B^T P$$

This Riccati equation can be solved by an optional method known in a field of linear system and thereby, the gain K can be determined.

Note that Q and R in the performance function J and the Riccati equation are positive-semidefinite and positive-definite symmetric matrixes each set optionally and are weighting matrixes of the performance function J determined by a person who constructs the system. For example, regarding this motion model, when expressing Q and R as follows and setting norm (magnitudes) of particular components (for example, dz/dt, dθ/dt) in the state variable vector X(t) in the above expression (3a) to norm larger than norm of the reminder components (for example, z and θ), the components having a large norm can converge stably, compared with the components having a small norm.

$$Q = \begin{pmatrix} 1 & 0 & 0 & 0 \\ 0 & 10^3 & 0 & 0 \\ 0 & 0 & 1 & 0 \\ 0 & 0 & 0 & 10^2 \end{pmatrix}, R = (1)$$

Further, when increasing the value of components of Q, transient property is improved, that is, the value of the state variable vector X(t) converges on a stable value rapidly. On the other hand, when increasing the value of R, a consumption of an energy is reduced.

The sprung damping control amount calculation section 60 calculates the state variable vector X(t) by solving the differential equation of the expression (2a) using a torque input value in the motion model section 62a. Then, to the driving/braking force conversion section 64 is supplied a value acquired by multiplying the state variable vector X(t), which is an output from the motion model section 62a, by the gain K determined for converging the state variable vector X(t) on zero or a minimum value. The driving/braking force conversion section 64 calculates a requested damping driving/braking force Fpbcreq by converting the unit of the value U(t) to the unit of the driving/braking force.

In the sprung damping control amount calculation section 60, a sympathetic vibration system is constructed and thus, the value of the state variable vector X(t) substantially includes only components each having natural frequency of the system with respect to an optional input. Therefore, a component, which generates a sprung vibration, can be reduced by correcting the driver-requested driving/braking force Fdrv using the requested damping driving/braking force Fpbcreq, which is acquired by converting the unit of the value U(t) to the unit of the driving/braking force, such that a component of the natural frequency is removed from the driver-requested driving/braking force Fdrv. In this case, the requested damping driving/braking force Fpbcreq is set such that the component of the natural frequency can be removed. According to the present embodiment, the sprung sympathetic vibration frequency is 1.5 Hz and thus, the sprung vibration having this frequency can be reduced.

Therefore, when the drive of the motor 30 is controlled while a value acquired by adding the requested damping driving/braking force Fpbcreq to the driver-requested driving/braking force Fdrv, the sprung vibration having the sprung sympathetic vibration frequency (in the present embodiment, for example, 1.5 Hz) can be suppressed.

When the magnitude (the absolute value) of the driver-requested driving/braking force Fdrv is small, the value of the target driving/braking force Freq alternatively changes between the positive and negative values. In other words, the target driving/braking force Freq alternatively changes between the driving and braking forces. Thereby, the motor torque repeatedly crosses zero and the rattling noise is generated when the gears of the reduction gear 31 collides to each other through the backlash therebetween.

In order to suppress such a generation of the rattling noise, according to the present embodiment, the damping control limit section 52 is provided. The requested damping driving/braking force Fpbcreq calculated by the sprung damping control amount calculation section 60 and the driver-requested driving/braking force Fdrv calculated by the driver-requested damping driving/braking force calculation section 51 are input to the damping control limit section 52. The damping control limit section 52 determines, on the basis of the driver-requested driving/braking force Fdrv, whether or not there is a possibility that the rattling noise is geratated and then, sets the damping driving/braking force Fpbc (a conclusive sprung damping control amount) acquired by limiting the requested damping driving/braking force Fpbcreq as necessity and outputs a signal for requesting an increase of the damping force to the absorber ECU 70.

Figure 5:
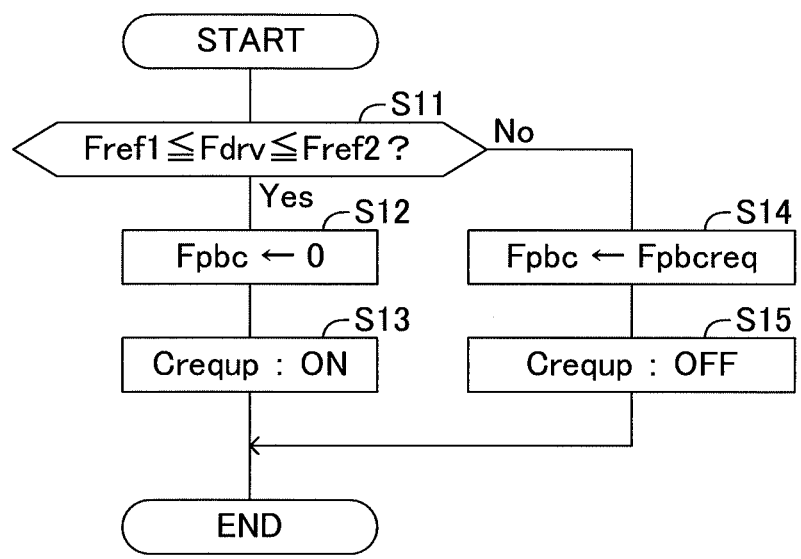
FIG. 5 illustrates a flowchart showing a rattling noise suppression control routine.

Below, a process executed by the damping control limit section 52 will be described in detail. FIG. 5 illustrates a sprung damping limit process routine executed by the damping control limit section 52. This sprung damping limit process routine is repeatedly executed with a predetermined calculation period.

When this sprung damping limit process routine starts, at a step S11, the damping control limit section 52 reads a driver-requested driving/braking force Fdrv and determines whether or not the driver-requested driving/braking force Fdrv is within a range between a first threshold Fref1 as a lower limit value and a second threshold Fref2 as an upper limit value. The range between the first and second thresholds is a range set for determining whether or not there is a possibility that the rattling noise is generated. Hereinafter, this range will be referred to as "the rattling noise generation range R".

Figure 6:
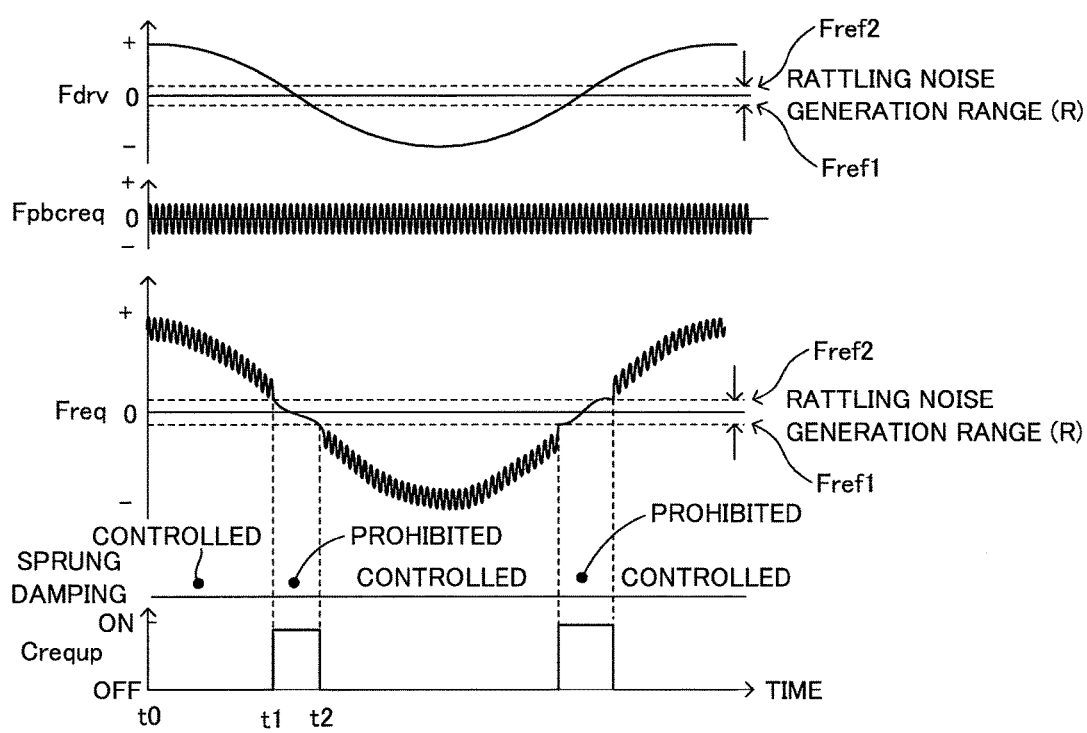
FIG. 6 illustrates a graph showing a driver-requested driving/braking force, a driving/braking force for a damping control, a target driving/braking force and a damping force increase request signal.

As illustrated by a graph located at an upper side in FIG. 6, the rattling noise generation range R corresponds to a range of the driver-requested driving/braking force Fdrv set to have a first width at the negative side with respect to zero and a second width at the positive side with respect to zero, the first width being generally the same as the second width. Therefore, the first threshold Fref1 as the lower limit value of the rattling noise generation range R is negative and the second threshold Fref2 as the upper limit value of the rattling noise generation range R is positive. In addition, the absolute value of the first threshold Fref1 is the same as the absolute value of the second threshold Fref2. In this regard, although it is not necessary that the absolute value of the first threshold Fref1 is exactly the same as the absolute value of the second threshold Fref2, it is preferred that the absolute value of the first threshold Fref1 is generally the same as the absolute value of the second threshold Fref2.

Further, each of the absolute values of the first and second thresholds Fref1 and Fref2 for defining the rattling noise generation range R is set to a value (for example, 50N) equivalent to the maximum value of the requested damping driving/braking force Fpbcreq when the sprung damping control is executed.

When the damping control limit section 52 determines that the driver-requested driving/braking force Fdrv is within the rattling noise generation range R, the damping control limit section 52 determines "Yes" at the step S11 and then, proceeds with the process to a step S12 to set the damping driving/braking force Fpbc to zero (Fpbc←0). In other words, independently of the requested damping driving/braking force Fpbcreq calculated by the sprung damping control amount calculation section 60, the damping control limit section 52 sets the damping driving/braking force Fpbc used for the sprung damping control to zero. Therefore, in this case, the driver-requested driving/braking force Fdrv itself is set as the target driving/braking force Freq. Thereby, the sprung damping control using the driving/braking force of the motor 30 is prohibited.

Then, the damping control limit section 52 proceeds with the process to a step S13 to send a damping force increase request signal Crequp, which indicates a request for increasing the damping force, to the absorber ECU 70. In the present embodiment, the damping force increase request signal Crequp indicates whether or not the increase of the damping force is requested and for example, when the increase of the damping force is requested, an ON signal (a high level signal) is output and on the other hand, when no increase of the damping force is requested, an OFF signal (a low level signal) is output. Therefore, at the step S13, the ON signal is output as the damping force increase request signal Crequp.

When the damping force increase request signal Crequp is the ON signal, the absorber ECU 70 increases the damping forces of the shock absorbers 23 of the four vehicle wheels. In this case, the absorber ECU 70 adds, to the damping ratio of each of the shock absorbers 23, a damping ratio corresponding to the damping force output by the sprung damping control executed by the motor ECU 50. According to the present embodiment, an amount of addition to the damping ratio of each of the shock absorbers 22 is a fixed value and for example, is set to 0.05. The absorber ECU 70 controls the damping ratio of each of the shock absorbers 23, for example, to within a range of 0.1 to 0.5 and when the damping force increase request signal Crequp is the ON signal, the absorber ECU 70 adds 0.05 to the damping ratio of each of the shock absorbers 23.

On the other hand, when the damping control limit section 52 determines that the driver-requested driving/braking force Fdrv is not within the rattling noise generation range R, the damping control limit section 52 determines "No" at the step S11 and proceeds with the process to a step S14 to set the requested damping driving/braking force Fpbcreq as the damping driving/braking force Fpbc (Fpbt←Fpbcreq). In other words, the requested damping driving/braking force Fpbcreq calculated by the sprung damping control amount calculation section 60 is set as the damping driving/braking force Fpbc used for the sprung damping control. Therefore, in this case, as the target driving/braking force Freq is set a value acquired by adding the damping driving/braking force Fpbc (=Fpbcreq) to the target driving/braking force Freq. Accordingly, the sprung damping control using the driving/braking force of the motor 30 is executed.

Then, the damping control limit section 52 proceeds with the process to a step S15 to output an OFF signal, which indicates that no increase of the damping force is requested, to the absorber ECU 70 as the damping force increase request signal Crequp. In this case, the absorber ECU 70 controls the damping forces of the shock absorbers using a normal damping ratio without adding a value to each of the damping ratios of the shock absorbers 23 of the four vehicle wheels.

FIG. 6 illustrates a graph showing time-variations of the driver-requested driving/braking force Fdrv, the requested damping driving/braking force Fpbcreq, the target driving/braking force Freq and the damping force increase request signal Crequp. At a time t0, the driver-requested driving/braking force Fdrv is not within the rattling noise generation range R and thus, the target driving/braking force Freq is set to a value acquired by adding the requested damping driving/braking force Fpbcreq to the driver-requested driving/braking force Fdrv. Thereby, the sprung damping control using a driving/braking force of the motor 30 is executed. In this case, even when the requested damping driving/braking force Fpbcreq inverts from a positive value to a negative value or vice versa, the target driving/braking force Freq does not cross zero. Thus, no rattling noise is not generated from the reduction gear 31 occurs. In addition, the damping force increase request signal Crequp is the OFF signal. Thereby, the absorber ECU 70 executes a normal damping control which does not add any value to the damping ratio of each of the shock absorbers 23.

At a time t1, the driver-requested driving/braking force Fdrv falls within the rattling noise generation range R. Thereby, the damping driving/braking force Fpbc is set to zero and thus, the target driving/braking force Freq becomes the same value as the driver-requested driving/braking force Fdrv. Thus, the sprung damping control using a driving/braking force of the motor 30 is prohibited. Therefore, even when the requested damping driving/braking force Fpbcreq inverts from a positive value to a negative value or vice versa, the damping driving/braking force Fpbc is maintained at zero and thus, the inversion of the target driving/braking force Freq from a positive value to a negative value or vice versa, is not repeated. Thus, a generation of the rattling noise from the reduction gear 31 can be prohibited. In addition, the damping force increase request signal Crequp changes from the OFF signal to the ON signal. Thereby, the absorber ECU 70 adds a damping ratio, which corresponds to a damping force output by the sprung damping control executed by the motor ECU 50, to each of the damping ratios of the shock absorbers 23. Therefore, the sprung vibration can be damped rapidly.

At a time t2, the driver-requested driving/braking force Fdrv diverts from the rattling noise generation range R. Thereby, as described above, the sprung damping control using a driving/braking force of the motor 30 is restarted and the damping force control for the shock absorbers 23 is returned to the normal control.

According to the driving/braking force control device for the vehicle of the present embodiment described above, when the driver-requested driving/braking force Fdrv is within the rattling noise generation range R, the sprung damping control using a driving/braking force of the motor 30 is prohibited and the damping ratio of each of the shock absorbers 23 is increased. Therefore, both of the suppression of the generation of the rattling noise and the suppression of the sprung vibration can be achieved.

Modified Example of Sprung Damping Limit Process Routine

Next, a modified example of the sprung damping limit process routine will be described. In the sprung damping limit process routine according to the above-mentioned embodiment, the motor ECU 50 outputs a damping force increase request signal Crequp, which indicates whether or not an increase of the damping force is requested, to the absorber ECU 70 and the absorber ECU 70 controls the damping ratio of each of the shock absorbers 23 by adding a constant amount to the damping ratio of each of the shock absorbers 23 when the damping force increase request signal Crequp is the ON signal. To the contrary, according to this modified example, an amount of the increase of the damping force (i.e., an amount of the addition to the damping force) of each of the shock absorbers 23 is varied by incorporating information on the requested increase amount of the damping force of each of the shock absorbers 23, into the damping force increase request signal Crequp output from the motor ECU 50.

Figure 7:
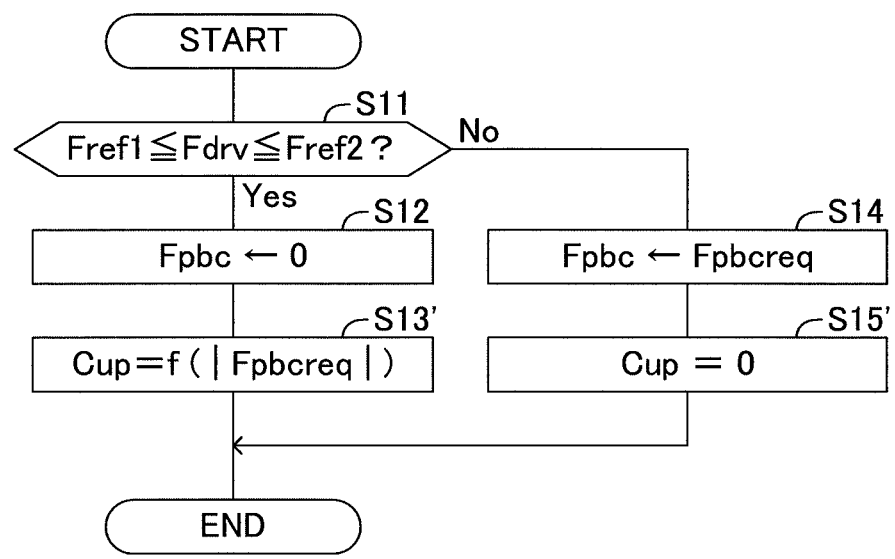
FIG. 7 illustrates a flowchart showing a rattling noise suppression control routine according to a modified example.

FIG. 7 illustrates a sprung damping limit process routine executed by the damping control limit section 52 according to this modified example. According to this modified example, in place of the steps S13 and S15 of the sprung damping limit process routine according to the above-mentioned embodiment, steps S13' and S15' are employed. Hereinafter, the same processes of the routine illustrated in FIG. 7 as the processes of the routine illustrated in FIG. 6 are denoted by reference symbols commonly used throughout the drawings, respectively and the descriptions of the processes will be omitted.

When the damping control limit section 52 determines that the driver-requested driving/braking force Fdrv is within the rattling noise generation range R, the damping control limit section 52 determines "Yes" at the step S11 and proceeds with the process to the step S12 to set the damping driving/braking force Fpbc to zero (Fpbc←0). Then, the damping control limit section 52 proceeds with the process to a step S13'. At the step S13', the damping control limit section 52 calculates a requested damping ratio increase amount Cup depending on an absolute value of the requested damping driving/braking force Fpbcreq. The absolute value of the requested damping driving/braking force Fpbcreq corresponds to an amplitude of the requested damping driving/braking force Fpbcreq, which oscillates between the positive and negative values.

Figure 8:
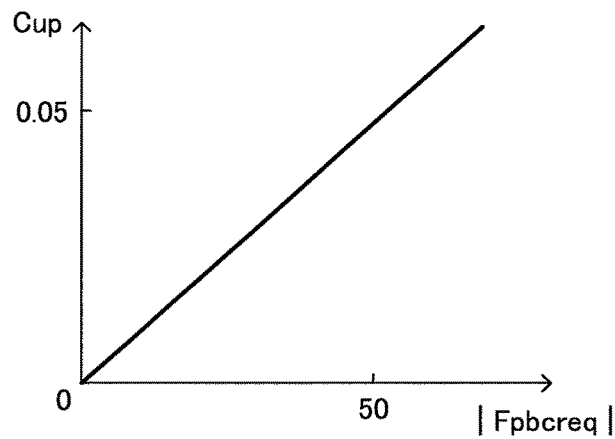
FIG. 8 illustrates showing a lookup table for setting a requested damping force increase amount.

FIG. 8 illustrates a graph showing a relationship between the absolute value of the requested damping driving/braking force Fpbcreq and the requested damping ratio increase amount Cup. In this example, the requested damping ratio increase amount Cup is set to a value proportional to the absolute value of the requested damping driving/braking force Fpbcreq. The damping control limit section 52 has stored association data, which indicates the relationship between the absolute value of the requested damping driving/braking force Fpbcreq and the requested damping ratio increase amount Cup (hereinafter, this relationship will be referred to as "the damping ratio increase property"), in the form of a function or a lookup table or the like and calculates the requested damping ratio increase amount Cup using the association data.

The damping control limit section 52 outputs the damping force increase request signal Crequp, which includes information on the calculated request damping ratio increase amount Cup, to the absorber ECU 70. In the above-mentioned embodiment, the damping force increase request signal Crequp is a flag signal indicating high-level/low-level. On the other hand, in this modified example, the damping force increase request signal Crequp is a signal indicating a value of the requested damping ratio increase amount Cup.

When the absorber ECU 70 receives the damping force increase request signal Crequp, the absorber ECU 70 adds the requested damping ratio increase amount Cup to the damping ratio of each of the shock absorbers 23 of the four vehicle wheels in accordance with the requested damping ratio increase amount Cup indicated by the damping force increase request signal Crequp. Thereby, while the sprung damping control using the driving/braking force of the motor 30 is prohibited, the damping ratio of each of the shock absorbers 23 is increased as the absolute value of the requested damping driving/braking force Fpbcreq increases, that is, the degree of the sprung vibration increases. Therefore, the sprung vibration can be damped appropriately depending on the degree of the sprung vibration.

On the other hand, when the damping control limit section 52 determines that the driver-requested driving/braking force Fdrv is not within the rattling noise generation range R, the damping control limit section 52 determines "No" at the step S11 and proceeds with the process to the step S14 to set the requested damping driving/braking force Fpbcreq to the damping driving/braking force Fpbc (Fpbc←Fpbcreq). Then, the damping control limit section 52 proceeds with the process to a step S15'. At the step S15', the damping control limit section 52 outputs the damping force increase request signal Crequp, which indicates the requested damping ratio increase amount Cup corresponding to zero, to the absorber ECU 70. Thereby, the absorber ECU 70 controls the damping forces of the shock absorbers 23 using the damping ratio set by the normal damping force control without increasing the damping ratio of each of the shock absorbers 23.

Modified Example 1 of Damping Ratio Increase Property

The sprung damping control executed by the motor ECU 50 suppresses the vehicle vibration having a frequency around the sprung sympathetic frequency (for example, 1.5 Hz). On the other hand, the damping force control executed by the absorber ECU 70 does not direct only to control the damping forces of the shock absorbers 23 for damping the sprung vibration. In other words, as described above, the vehicle-speed-responsive control, the roll attitude control, the unsprung damping control, the VSC cooperative control, the mode switching control and the like are also executed. Therefore, when the damping ratios of the shock absorbers 23 are increased in proportion to the absolute value of the requested damping driving/braking force Fpbcreq while the sprung damping control using the barking/driving force of the motor 30 has been prohibited, the damping coefficient increases with respect to the vibration having any frequency and thus, a function to be essentially achieved decreases to damage a comfortability of ride of the vehicle.

Figure 9:
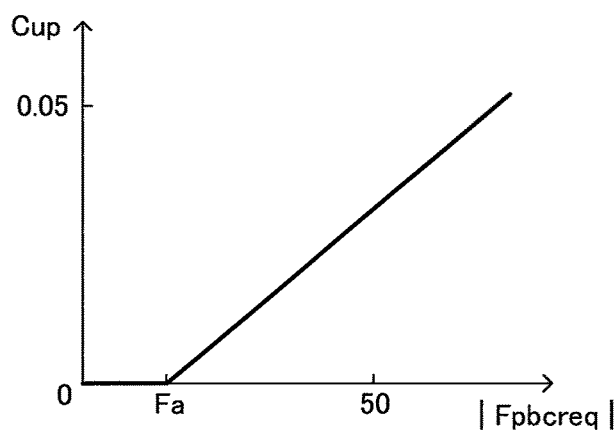
FIG. 9 illustrates another lookup table for setting a requested damping force increase amount.

Next, an example of an improved damping ratio increase property will be described. FIG. 9 illustrates a damping ratio increase property according to a modified example 1. In this damping ratio increase property, when the absolute value of the requested damping driving/braking force Fpbcreq is equal to or smaller than a predetermined set value Fa, the requested damping ratio increase amount Cup is set to zero. On the other hand, in this damping ratio increase property, when the absolute value of the requested damping driving/braking force Fpbcreq is larger than the set value Fa, the requested damping ratio increase amount Cup increases in proportion to the increase of the absolute value of the requested damping driving/braking force Fpbcreq. In other words, a dead band is provided regarding the requested damping driving/braking force Fpbcreq.

When the sprung vibration is small, an influence of the sprung vibration on the driver of the vehicle (the degree of the uncomfortable feeling of the driver) is small. Accordingly, when the sprung vibration is small, the essential function of the absorber ECU 70 can be achieved by using the damping ratio increase property according to the modified example 1. On the other hand, when the sprung vibration increases to the considerable extent, the requested damping ratio increase amount Cup is set such that the requested damping ratio increase amount Cup increases as the absolute value of the requested damping driving/braking force Fpbcreq increases. Thus, even when the sprung damping control using the driving/braking force of the motor 30 has been prohibited, the sprung vibration can be damped rapidly. Therefore, according to this modified example 1, both of the suppression of the sprung vibration and the appropriate damping force control can be suitably achieved.

Modified Example 2 of Damping Ratio Increase Property

Figure 10:
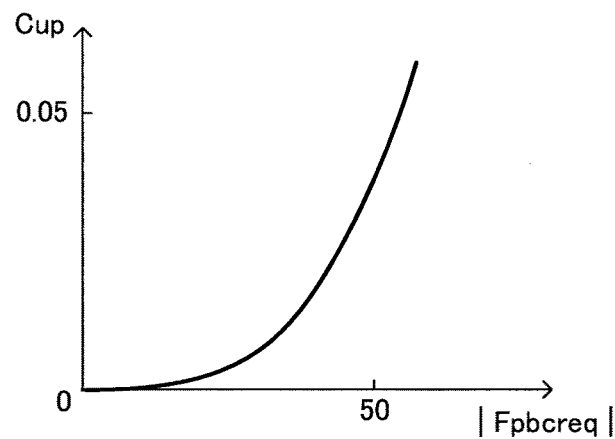
FIG. 10 illustrates another lookup table for setting a requested damping force increase amount.

FIG. 10 illustrates a modified example 2 of the damping ratio increase property. This damping ratio increase property has a non-linear property in which an increase degree of the requested damping ratio increase amount Cup with respect to the increase of the absolute value of the requested damping driving/braking force Fpbcreq increases as the absolute value of the requested damping driving/braking force Fpbcreq increases. In other words, this damping ratio increase property has a property in which the requested damping ratio increase amount Cup increases exponentially (in a quadric manner) as the absolute value of the requested damping driving/braking force Fpbcreq increases. Therefore, when the sprung vibration is small, the requested damping ratio increase amount Cup is set to a considerably small value, that is, a dead band is provided with respect to the substantial requested damping driving/braking force Fpbcreq and thus, the essential function of the absorber ECU 70 can be appropriately achieved.

Further, when the sprung vibration increases to the considerable extent, the requested damping ratio increase amount Cup is set to a large value and thus, the sprung vibration, which causes the driver to feel discomfort, can be suppressed. Therefore, according to the modified example 2, both of the suppression of the sprung vibration and the appropriate damping force control can be suitably achieved. In addition, there is no point, at which the requested damping ratio increase amount Cup changes rapidly and thus, the driver is unlikely to feel discomfort.

The driving/braking force control device for the vehicle according to the embodiment has been described. The invention is not limited to the above-described embodiment and the modified examples and various modifications can be employed without departing the object of the present invention.

For example, in the above-described embodiment, employed is a configuration that the damping driving/braking force (i.e., the requested damping driving/braking force Fpbcreq) necessary for the sprung damping control is calculated using the motion model of the vehicle. However, there may be employed a configuration that the damping driving/braking force is calculated for suppressing the vertical vibration of the vehicle detected directly. For example, there may be employed a configuration for calculating a damping driving/braking force having a magnitude in proportion to a vertical speed of the vehicle calculated on the basis of a vertical acceleration of the vehicle detected by the sprung acceleration sensor.

Further, there may be employed a damping ratio increase property acquired by a combination of the damping ratio increase properties according to the modified example 1 (FIG. 9) and the modified example 2 (FIG. 10). For example, there may be employed a damping ratio increase property having a non-linear property that when the absolute value of the requested damping driving/braking force Fpbcreq is equal to or smaller than the predetermined set value Fa, the requested damping ratio increase amount Cup is set to zero and when the absolute value of the requested damping driving/braking force Fpbcreq is larger than the set value Fa, the increase degree of the requested damping ratio increase amount Cup increases with respect to the increase of the absolute value of the requested damping driving/braking force Fpbcreq as the absolute value of the requested damping driving/braking force Fpbcreq increases.

What is claimed is:

1. A sprung vibration suppression device for a vehicle, comprising:
    a motor for generating torque to be transmitted to at least one of a pair of right and left front vehicle wheels and a pair of right and left rear vehicle wheels via a gear device to generate driving/braking force at the at least one of the pair of right and left front vehicle wheels and the pair of right and left rear vehicle wheels;
    shock absorbers for generating damping force to damp sprung vibration; and
    an electronic control unit programmed to control driving/braking force output from the motor and damping force generated by the shock absorbers,
    the electronic control unit being programmed:
    to calculate a target driving/braking force including a base requested driving/braking force requested for driving the vehicle and a damping driving/braking force necessary for sprung damping control; and
    to control the driving/braking force output from the motor in accordance with the calculated target driving/braking force;
    to determine whether the base requested driving/braking force is within a rattling noise generation range, which is set for determining whether there is a possibility that rattling noise is generated in the gear device, the rattling noise generation range being defined by a first set value as a lower limit value and a second set value as an upper limit value, the first set value being a negative value and the second set value being a positive value;
    to set the damping driving/braking force to zero and increase the damping force generated by the shock absorbers when the electronic control unit determines that the base requested driving/braking force is within the rattling noise generation range;
    to set an increase amount for increasing the damping force depending on an absolute value of the damping driving/braking force when the electronic control unit determines that the base requested driving/braking force is within the rattling noise generation range; and
    to add the increase amount to the damping force to increase the damping force.

2. The sprung vibration suppression device for the vehicle according to claim 1, wherein the electronic control unit is programmed:
    to set the increase amount for increasing the damping force to zero when the electronic control unit determines that the base requested driving/braking force is within the rattling noise generation range and the absolute value of the damping driving/braking force is equal to or smaller than a predetermined set value; and
    to set the increase amount for increasing the damping force to a variable amount when the electronic control unit determines that the base requested driving/braking force is within the rattling noise generation range and the absolute value of the damping driving/braking force is larger than the predetermined set value, the variable amount increasing as the absolute value of the damping driving/braking force increases.

3. The sprung vibration suppression device for the vehicle according to claim 1, wherein the electronic control unit is programmed to increase an increase degree of the increase amount for increasing the damping force with respect to an increase of the absolute value of the damping driving/braking force as the absolute value of the damping driving/braking force increases when the electronic control unit determines that the base request driving/braking force is within the rattling noise generation range.

4. The sprung vibration suppression device for the vehicle according to claim 2, wherein the electronic control unit is programmed to increase an increase degree of the increase amount for increasing the damping force with respect to an increase of the absolute value of the damping driving/braking force as the absolute value of the damping driving/braking force increases when the electronic control unit determines that the base request driving/braking force is within the rattling noise generation range.

* * * * *